United States Patent [19]

Roeloffzen

[11] 3,899,620
[45] Aug. 12, 1975

[54] CAMOUFLAGE NETTING

[75] Inventor: Johannes Franciscus Roeloffzen, Sas van Gent, Netherlands

[73] Assignee: Spectrum N.V., Sas van Gent, Netherlands

[22] Filed: Apr. 14, 1972

[21] Appl. No.: 244,106

[30] Foreign Application Priority Data
Apr. 23, 1971 Netherlands.................... 7105590

[52] U.S. Cl. ............... 428/112; 264/103; 264/167; 428/192; 428/236; 428/238; 428/255; 428/284; 428/919
[51] Int. Cl.$^2$......................................... D04G 1/00
[58] Field of Search ............. 161/57, 58, 59, 84, 85, 161/86, 89, 98, 19; 264/103, 167, 177, 210, 288; 156/167, 180, 181

[56] References Cited
UNITED STATES PATENTS

| | | | |
|---|---|---|---|
| 2,351,142 | 6/1944 | Mitchell.............................. | 161/19 |
| 2,825,168 | 3/1958 | Ekman................................. | 161/89 |
| 3,119,729 | 1/1964 | Ljungbo............................... | 161/89 |
| 3,123,512 | 3/1964 | Mercer........................ | 161/DIG. 6 |
| 3,199,547 | 8/1965 | Knutson et al....................... | 161/89 |
| 3,553,066 | 9/1967 | Cavalier et al....................... | 161/89 |
| 3,654,056 | 4/1972 | Nisbet et al.......................... | 161/89 |
| 3,660,215 | 5/1972 | Pawlicki............................... | 161/93 |

Primary Examiner—George F. Lesmes
Assistant Examiner—James J. Bell
Attorney, Agent, or Firm—Spensley, Horn and Lubitz

[57] ABSTRACT

An improvement for camouflage nets. Camouflage nets are trimmed with elongated elements comprising support members having non-woven vegetable fibers disposed on either side thereof. The non-woven vegetable fibers are adapted for the particular application prior to coupling to the support members. The adaptation of the fibers can take the form or color, impermeability to water or other environmental safeguards.

16 Claims, 3 Drawing Figures

CAMOUFLAGE NETTING

BACKGROUND OF THE INVENTION

1. Field of the Invention

The invention relates to a camouflage net for military purposes comprising a large mesh ground net and trimming material connected with said ground net.

2. Prior Art

Such nets are known, in which jute strips are twisted in the net. An important disadvantage of such nets is the heavy weight and due to the woven structure of the strips a permanent leaf-effect cannot be obtained. These known nets have furthermore a large volume. During use the trimming strips tend to unravel, which has a highly harmful effect on the camouflage properties. There have been proposed camouflage nets in which plastic foils are employed as a trimming material. These nets also have various disadvantages. When the net is wet, a glossy or mirror effect will readily occur so that the camouflage properties are reduced. During use the properties are adversely affected by temperature variations. Trimming is obtained by means of large pieces and in the case of damage, the damaged pieces have to be cut out, whilst new pieces have to be arranged in place with the aid of a large number of fastening means, which can be carried out only with great difficulty also in view of the manner in which said pieces are fastened to the net. Moreover, the plastic foils are secured to one side of the supporting net, which may give rise, in some cases, to unwanted sagging of the net. During use unsolved dye particles may be released, which may endanger the operators of the nets. A further disadvantage of the use of plastic foils is that they can be readily charged electrostatically, which may give rise to sparking and fire. It has been found in practice that during use disturbing noise may be produced. Due to contact with hot parts such as exhaust pipes of combustion engines and the like, the plastic foils will readily melt and the nets are often poorly resistant to the effect of engine fuel and lubricants, with which the nets may frequently come into contact during use.

SUMMARY OF THE INVENTION

The invention has for its object to provide a camouflage net of the kind set forth, by which the disadvantages of the camouflage nets of the kind hitherto known can be avoided at least for the major part.

According to the invention, this can be achieved by trimming with pieces or elongated strips comprising a support covered on either side with non-woven vegetable fiber. In this way a strong, light-weight net of small volume having very satisfactory properties can be made. For example, prior to their application, the fibers may be dyed with immersion dyes, then oxidized, rinsed and saponified so that a high resistance to weather influences is obtained, whilst it is practically not possible for unsolved dye particles to be left. A further advantage of the use of such a trimming material resides in that it may be cut in any desired form without the risk of unravelling of the trimming material. The fibers may be readily rendered impermeable to water and also owing to the presence of a support sandwiched between the fiber layers, the net embodying the invention can be readily dried, when it has become wet.

The fibers may be dyed in any desired color and preferably differently colored fiber layers will be applied to either side of the support. A particularly favorable effect is obtained, when the trimming material is worked with needles from one side subsequent to the application of the fiber layers so that on one side the original color is maintained whereas on the other side a mixed appearance is obtained. Mirror reflections or electrostatic charges are completely avoided with such a net.

The fiber material is preferably formed at least mainly by flax fibers. This provides very strong trimming material having a very high resistance to deformation and a comparatively slight weight. The volume of such a flax-fiber covered net is comparatively very small. A further advantage of the flax fibers is that they can be worked very satisfactorily for the manufacture of the net. Flax fibers can be readily impregnated with various chemical substances which have a favorable effect on the properties and the lifetime of the camouflage net.

BRIEF DESCRIPTION OF THE DRAWINGS

For a better understanding of the invention and to show how the same may be readily carried into effect, reference is made by way of example to the embodiment shown schematically in the accompanying Figures.

DESCRIPTION OF A PRESENTLY PREFERRED EMBODIMENT

Figure 1:
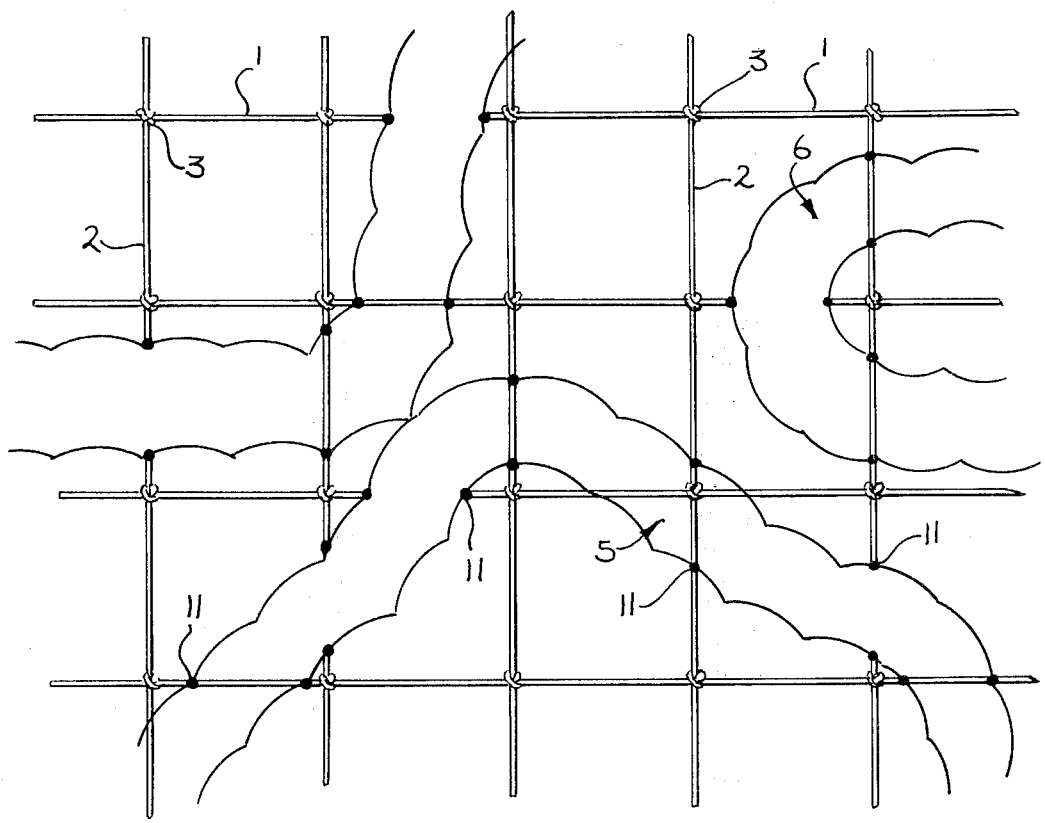
FIG. 1 shows schematically a view of a ground net provided with a few strips.

The large-mesh ground net shown in FIG. 1 is made from polyester or polyamide threads or yarns 1 and 2, arranged at right angles to each other and tied to each other at the crossings 3. The size of the meshes preferably lies between 50 × 50 mms and 80 × 80 mms so that, for example, branches or the like can be readily inserted into the net, whilst also exhaust pipes of vehicles and the like can be passed through the net without the need for cutting the net. The resultant ground net is preferably impregnated in order to obtain a resistance to fire and impermeability to water, coloring substances being added to the impregnant so that the ground net may have a color corresponding to the trimming material. The size of the meshes will match the width of the trimming pieces or strips to be described hereinafter and to be employed in the net. The ground net may have any desired dimension in accordance with the size of the object to be camouflaged.

Trimming pieces or strips 5, 6 are twisted across the meshes of the ground net in completely arbitrary manner. The preferred material for these trimming pieces will be described below. The ends of the pieces may be fastened to the ground net with the aid of a polyamide or polyester rope 12. The length of the pieces or strips may vary between 20 and 200 cms, whilst small open areas may be filled out by the shorter strips.

Figure 2:
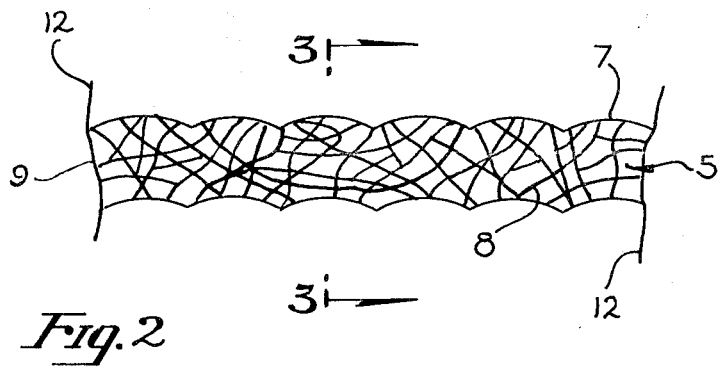
FIG. 2 is an elevation of one embodiment of a strip.

The pieces are cut from large sheets or punched therefrom. The edges 7 of the pieces or strips are preferably modeled in the form of leaves or corrugations, as shown in FIG. 2. When the pieces are worked up in the camouflage net, a satisfactory leaf-effect is obtained.

A particularly favorable trimming material is formed by a polyester support 10, to each side of which is applied a film of non-woven fiber 8 of plants, preferably flax or a mixture of flax and cotton fibers.

Figure 3:
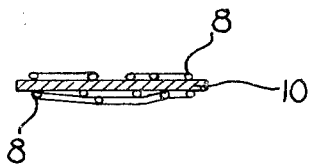
FIG. 3 is a cross-sectional view taken along line 3—3 of FIG. 2, showing the trimming strip.

This polyester support 10 is formed by a supporting body composed of threads 8 arranged cross-wise to each other (as shown in FIGS. 2 and 3), in general, a tissue with warp and weft yarns, said body being dyed whilst in the state of yarn or tissue with coloring substances not interfering with infrared reflections, dying being carried out preferably at a temperature of 140° C so that shrinkage of the support will practically no longer occur and the mechanical deformation is chemically stabilized. The support in the ready product will be practically invisible since it is completely sandwiched between the fiber layers. Thus, the trimming strips 5 and 6 have a support layer 10 which is sandwiched or otherwise disposed between the two fiber covering layers 8. As is clearly shown in FIG. 3, one covering layer is disposed on one side of the supporting layer 10 and a second covering layer is disposed on the other or opposite side of the supporting layer.

The flax fiber is preferably dyed in the state of flocks with the aid of immersion dyes having a given infrared reflection in accordance with the requirements of modern camouflage nets in this field. It is thus possible to obtain a particularly high resistance to wet weather conditions, to light and to any harmful influence in general, which is of essential importance for camouflage nets used in free fields.

Before the trimming material is cut to the desired pieces or strips, it is first impregnated with impregnating solutions in order to obtain permanent resistance to fire, to rot and fungi and to render the material impermeable to water.

The fiber layers 8 (non-woven layers) applied to the support are bound by a binder resistant to solvents in order to avoid swelling or dissociation of the trimming material in the event of spilling solvents and/or mineral oil and the like on the net, for example, when filling the tanks of vehicles. The pieces thus made and composed can be arranged in the net in the manner described above, whilst a further connection with the net is established by securing the pieces at various points to the ground net with the aid of pre-impregnated and pre-dyed synthetic yarns 11.

In practice it has been found that in this way particularly effective camouflage nets can be obtained. The vegetable fibers 8 readily absorb moisture, it is true, but this property is reduced to a given extent by rendering the material impermeable to moisture. Particularly owing to the presence of the supporting tissue, the trimming material has a given volume of air and a given permeability to air so that the trimming material will readily dry. Under bad weather conditions it may be useful that the net absorbs a given quantity of moisture, since it will then be less sensitive to the influence of wind.

A camouflage net of the composition described above has furthermore a particularly satisfactory resistance to creasing, whilst it is agreeable and natural to feel and can be readily manipulated: the danger of electrostatic charges is practically nil. In contrast to the conventional nets of synthetic substances no aging phenomena such as hardening or stiffening will occur after some time, the net remains flexible and maintains its strong composition.

A particularly favorable composition of the support is obtained by making the support completely of polyester yarns Denier 250/48, type 52S having a twist of 160 tours a meter Z. The tissue preferably has a chain density of 5 to 6 yarns a centimetre and a weft density of 5 to 6 yarns a centimetre. The weight is about 38 to 40 gs/square metre. When exposed to hot air of a temperature of 190° C for a quarter of an hour, the shrinkage of the material is about 7 to 8% and when boiled at a temperature of 100° C for one hour the shrinkage is about 3 to 4%. At ruptures the elongation is about 18 to 20%.

When such a support is used, a particularly strong and flexible trimming material is obtained, which has a satisfactory resistance to the generally rough manipulation of such nets. The weight of a completely ready net of 340 × 680 cms is about 7 kgs, whilst the net can be folded to great compactness, which is advantageous in storing the net on vehicles, in tanks and the like.

Apart from being formed by a tissue of warp and weft yarns, yarns arranged cross-wise one on the other, not interwoven and not interconnected at the crossings may be employed for the support.

Prior to application the fibers of the layers to be applied to either side of the support may be dyed in different colors so that the camouflage net has a socalled "winter side" and a so-called "summer side."

It is furthermore possible to bind a few loose strips to the net so that repair material is always at hand.

I claim:

1. A camouflage unit comprising:
   a. a supporting net;
   b. a plurality of trimming strips randomly disposed through said supporting net, said trimming strips formed from a supporting layer and first and second covering layers, said first covering layer disposed on one side of said supporting layer, and said second covering layer disposed on the opposite side of said supporting layer, said first and second covering layers comprised of randomly arranged, nonwoven bound together vegetable fibers.

2. A camouflage unit described in claim 1 wherein said vegetable fibers are comprised mainly of flax fibers.

3. A camouflage unit described in claim 1 wherein said vegetable fibers are comprised of a mixture of flax fibers and cotton fibers.

4. A camouflage unit described in claim 1 wherein said vegetable fibers are dyed while in the form of fiber flocks prior to being disposed on said supporting layer.

5. A camouflage unit described in claim 1 wherein said supporting layer is comprised of a polyester material having yarns arranged crosswise to each other.

6. A camouflage unit described in claim 5 wherein said polyester material is formed from polyester yarns of denier 250/48, the chain density being 5 to 6 yarns a centimeter and the weft density being 5 to 6 yarns a centimeter.

7. A camouflage unit described in claim 1 wherein said covering layer is a different color than said second covering layer.

8. A camouflage unit described in claim 1 wherein the edges of said supporting layer of said trimming strip are corrugated.

9. A camouflage unit described in claim 1 wherein said supporting net has meshes which measure from 50 by 50 mms to 80 by 80 mms.

10. A camouflage unit described in claim 1 wherein said trimming strips are disposed on said supporting net by weaving said trimming strip in a random manner across and through said meshes of said supporting net.

11. A camouflage unit described in claim 1 wherein said trimming strips are chemically treated such that said trimming strips are resistant to fungi, rot, fire and are impermeable to water.

12. A camouflage unit described in claim 1 wherein a plurality of said trimming strips are secured to said camouflage unit to be used for repair purposes.

13. A camouflage unit described in claim 1 wherein the fibers of said supporting layer are dyed at a temperature of about 140°C.

14. A camouflage unit described in claim 1 wherein said supporting layer of said trimming strip is pierced by needles from one side for providing a mixed appearance and for reducing electro static charges.

15. A camouflage unit comprising a preshrunk wide mesh supporting net and a plurality of trimming strips, said trimming strips being comprised of a polyester supporting layer each side being randomly covered with non-woven flax fibers; wherein a plurality of said trimming strips are disposed through said meshes of said supporting net forming the camouflage unit.

16. A camouflage unit comprising a preshrunk wide mesh supporting net and a plurality of trimming strips, said trimming strips being comprised of a polyester supporting layer and first and second covering layers, said first covering layer disposed on one side of each supporting layer and said second covering layer disposed on the opposite side of each supporting layer, said covering layers comprised of randomly distributed, non-woven cotton fibers, wherein a plurality of said trimming strips are disposed through said meshes of said supporting net forming said camouflage unit.

* * * * *